US00RE37016E

(19) United States
(12) Reissued Patent
Morano

(10) Patent Number: US RE37,016 E
(45) **Date of Reissued Patent: *Jan. 16, 2001**

(54) FLOW CONTROL ELEMENT AND COVERED DRINKING CUP

(75) Inventor: Emanuel P. Morano, Totowa, NJ (US)

(73) Assignee: Playtex Products, Inc., Westport, CT (US)

( * ) Notice: This patent issued on a continued prosecution application filed under 37 CFR 1.53(d), and is subject to the twenty year patent term provisions of 35 U.S.C. 154(a)(2).

(21) Appl. No.: 09/130,227

(22) Filed: Aug. 6, 1998

Related U.S. Patent Documents

Reissue of:
(64) Patent No.: 5,542,670
Issued: Aug. 6, 1996
Appl. No.: 08/503,142
Filed: Jul. 17, 1995

(51) Int. Cl.[7] ..... A47G 19/22
(52) U.S. Cl. ..... 220/714
(58) Field of Search ..... 215/355, 11.1, 215/11.4, 11.5, DIG. 7, 902, 387, 389, 262, 270, 307, 271, 309, 329, 354, 311, 315, 247–249; 220/705, 703, 711, 714, 717, 719, 721, 724, 231, 240, 254, 253, 367.1; 222/482, 490, 494; 137/588, 845, 512.4

(56) References Cited

U.S. PATENT DOCUMENTS

| | | | |
|---|---|---|---|
| 4,138 | | 8/1845 | Pratt . |
| 1,206,661 | | 11/1916 | Booth . |
| 1,366,727 | * | 1/1921 | Gerstner . |
| 2,063,424 | * | 12/1936 | Ferguson . |
| 2,223,179 | | 11/1940 | Lougheed . |
| 2,321,236 | * | 6/1943 | Parkin . |

(List continued on next page.)

FOREIGN PATENT DOCUMENTS

| | | |
|---|---|---|
| 497999 | 5/1930 | (DE) . |
| 295 00 819 U | 3/1995 | (DE) . |
| 0 232 571 | 8/1987 | (EP) . |
| 0 257 880 | 3/1988 | (EP) . |

(List continued on next page.)

OTHER PUBLICATIONS

Advertisement, cover page titled: The first years . . . TUMBLE MATES®. . . 2 spill–proof cups (7oz.) 2 pages, copyright 1996, The First Years Inc. Second page discloses section entitled 2 spill–proof cups.

(List continued on next page.)

*Primary Examiner*—Stephen K. Cronin
*Assistant Examiner*—Robin A. Hylton
(74) *Attorney, Agent, or Firm*—Ohlandt, Greeley, Ruggiero & Perle, LLP

(57) ABSTRACT

A drinking cup has a cover which is formed with a drinking spout at one side and a vent at the other. Elements extend down from under the spout and the vent. A flow control element is provided and made of elastomeric material having a pair of spaced cavities on one side, each cavity having a floor at the bottom thereof. The cavities receive in frictional engagement respectively the lower ends of the elements. This engagement supports the flow control element with the floor of each cavity in sealed relation to its element. Each floor has a passage which is normally closed but opens on the occurrence of a pressure differential on opposite sides of the floor.

48 Claims, 2 Drawing Sheets

U.S. PATENT DOCUMENTS

| | | | | |
|---|---|---|---|---|
| 2,372,281 | * | 3/1945 | Jordan | 222/482 X |
| 2,534,614 | | 12/1950 | Michael . | |
| 2,608,841 | * | 9/1952 | Rice . | |
| 2,623,368 | * | 12/1952 | Olsen | 220/711 |
| 2,655,920 | * | 10/1953 | Cronin . | |
| 2,688,326 | | 9/1954 | Lerman . | |
| 2,745,568 | * | 5/1956 | Newton | 215/11.4 |
| 2,876,772 | * | 3/1959 | Witz . | |
| 3,273,703 | | 9/1966 | Stribley . | |
| 3,355,047 | * | 11/1967 | De Sole . | |
| 3,366,261 | | 1/1968 | Dewey . | |
| 3,372,832 | | 3/1968 | Yeater et al. . | |
| 3,424,157 | | 1/1969 | Di Paolo . | |
| 3,511,407 | * | 5/1970 | Palma . | |
| 3,635,380 | * | 1/1972 | Fitzgerald . | |
| 3,669,323 | | 6/1972 | Harker et al. . | |
| 3,704,803 | | 12/1972 | Ponder . | |
| 3,874,563 | * | 4/1975 | Schwartzman | 222/482 X |
| 3,878,962 | * | 4/1975 | Holbrook et al. . | |
| 3,905,512 | | 9/1975 | Albert et al. . | |
| 3,915,331 | | 10/1975 | Chenault . | |
| 3,964,509 | | 6/1976 | Daubenberger et al. . | |
| 3,964,631 | | 6/1976 | Albert . | |
| 4,002,168 | | 1/1977 | Petterson . | |
| 4,051,971 | * | 10/1977 | Saleri et al. . | |
| 4,133,457 | * | 1/1979 | Klassen | 222/490 X |
| 4,135,513 | * | 1/1979 | Arisland . | |
| 4,204,604 | * | 5/1980 | Morin et al. . | |
| 4,245,752 | * | 1/1981 | Prueher | 220/714 X |
| 4,303,170 | | 12/1981 | Panicci . | |
| 4,361,249 | | 11/1982 | Tuneski et al. . | |
| 4,401,224 | * | 8/1983 | Alonso . | |
| 4,545,491 | * | 10/1985 | Bisgaard et al. . | |
| 4,607,755 | | 8/1986 | Andreozzi . | |
| 4,660,747 | | 4/1987 | Borg et al. . | |
| 4,685,577 | * | 8/1987 | Chen . | |
| 4,723,668 | * | 2/1988 | Cheng . | |
| 4,728,006 | | 3/1988 | Drobish et al. . | |
| 4,760,937 | | 8/1988 | Evezich . | |
| 4,782,975 | | 11/1988 | Coy . | |
| 4,828,126 | * | 5/1989 | Vicinguerra . | |
| 4,828,141 | | 5/1989 | Coy . | |
| 4,865,207 | * | 9/1989 | Joyner et al. . | |
| 4,909,416 | | 3/1990 | Evezich . | |
| 4,921,112 | | 5/1990 | Juhlin et al. . | |
| 4,941,598 | | 7/1990 | Lambelet, Jr. . | |
| 4,946,062 | * | 8/1990 | Coy | 220/714 |
| 4,991,745 | | 2/1991 | Brown . | |
| 4,993,568 | | 2/1991 | Morifuji et al. . | |
| 5,005,737 | | 4/1991 | Rohr . | |
| 5,035,340 | * | 7/1991 | Timmons | 215/11.4 |
| 5,050,758 | | 9/1991 | Freeman et al. . | |
| 5,071,017 | * | 12/1991 | Stull . | |
| 5,079,013 | * | 1/1992 | Belanger | 222/490 X |
| 5,101,991 | | 4/1992 | Morifuji et al. . | |
| 5,186,347 | | 2/1993 | Freeman et al. . | |
| 5,211,298 | | 5/1993 | Bloch . | |
| 5,213,236 | | 5/1993 | Brown et al. . | |
| 5,339,995 | * | 8/1994 | Brown et al. . | |
| 5,346,107 | | 9/1994 | Bouix et al. . | |
| 5,377,877 | | 1/1995 | Brown et al. . | |
| 5,433,353 | | 7/1995 | Flinn . | |
| 5,472,122 | | 12/1995 | Appleby . | |
| 5,474,028 | * | 12/1995 | Larson et al. | 215/11.5 X |
| 5,477,980 | | 12/1995 | Chaffin . | |
| 5,477,994 | | 12/1995 | Feer et al. . | |
| 5,553,726 | | 9/1996 | Park . | |
| 5,615,809 | | 4/1997 | Feer et al. . | |
| 5,702,025 | * | 12/1997 | Di Gregorio | 220/714 X |
| 5,706,973 | * | 1/1998 | Robbins, III et al. | 220/714 |

FOREIGN PATENT DOCUMENTS

| | | | | |
|---|---|---|---|---|
| 0 160 336 | | 3/1992 | (EP) . | |
| 0 384 394 | | 8/1994 | (EP) . | |
| 0 634 922 | | 1/1995 | (EP) . | |
| 1364891 | | 5/1964 | (FR) . | |
| 116872 | | 6/1918 | (GB) . | |
| 460274 | | 2/1937 | (GB) . | |
| 1 253 398 | | 11/1971 | (GB) . | |
| 2 029 379 | | 3/1980 | (GB) . | |
| 2053865 | * | 2/1981 | (GB) | 220/719 |
| 2 139 903 | | 11/1984 | (GB) . | |
| 2169210 | | 7/1986 | (GB) . | |
| 2 226 014 | | 6/1990 | (GB) . | |
| 2 266 045 | | 10/1993 | (GB) . | |
| 93/19718 | * | 10/1993 | (WO) | 220/714 |
| WO97/08979 | | 3/1997 | (WO) . | |

OTHER PUBLICATIONS

Copy of Rear of package titled "Playtex® Spill–Proof Cup", Copyright 1995, Playtex Products, Inc.

* cited by examiner

FLOW CONTROL ELEMENT AND COVERED DRINKING CUP

Matter enclosed in heavy brackets [ ] appears in the original patent but forms no part of this reissue specification; matter printed in italics indicates the additions made by reissue.

FIELD OF THE INVENTION

This invention relates to a covered drinking cup of the type often used by infants and children as a training cup because it safeguards against spills and provides liquid flow through a nipple-like spout. More specifically, this invention relates to covered drinking cups that provide a leak-proof flow of the liquid and venting of the head space as liquid is withdrawn.

BACKGROUND OF THE INVENTION

In the past nursing bottles and cups for dispensing milk and other liquids to infants and children have often been in the form of vented covered containers. For instance, U.S. Pat. No. 2,372,281 to Jordan, which issued on Mar. 27, 1945, has a cover that provides a nipple on one side having flow-regulating means and a vent on the other side also having flow-regulating means. By adjusting the two flow-regulating means, the user can comfortably draw liquid from the nipple. As the liquid is withdrawn, air moves in through the vent to replace the withdrawn liquid and prevent negative pressure build-up which in the extreme can stop liquid flow.

Another covered drinking cup is disclosed in U.S. Pat. No. 2,608,841 to Rice which issued on Sep. 2, 1952. As the venting means, the Rice cup provides a manually adjustable valve which controls the ease with which air is admitted into the cup for venting. It thereby regulates the flow of liquid.

With respect to the admission of air into nursing bottles and the like, check valves have often been used and are disclosed in the U.S. Pat. Nos. 4,401,224 to Alonso which issued on Aug. 30, 1983; 4,545,491 to Bisgaard, et al. which issued on Oct. 8, 1985; 4,723,668 to Cheng which issued on Feb. 9, 1988; and 4,828,126 to Vincinguerra which issued on May 6, 1989.

Other vent means are disclosed in U.S. Pat. No. 4,865,207 to Joyner, et al. which issued on Sept. 12, 1989 in which a fabric hydrophobic filter passes air into the nurser.

U.S. Pat. No. 4,135,513 to Arisland, which issued on Jan. 23, 1979, discloses a drinking nozzle for a nursing bottle which incorporates air venting means, opening a valve when the pressure within the container is substantially less than atmospheric pressure to thereby vent the head space.

U.S. Pat. No. 5,079,013 to Belanger, which issued on Jan. 7, 1992, discloses a dripless liquid feeding/training container in which the cover is provided with two spring-biased check valves. One check valve is a spring biased ball check that permits inward air flow for venting and the other check valve is a spring-biased outlet valve that opens by the sucking action of the infant and springs closed when the sucking action relents. The container is described as "dripless".

One of the shortcomings of some of the prior art is that the valves involved have metal parts. Further, the number of the parts involved makes such containers difficult to manufacture, assemble and clean. There is, hence, a need for a less complicated structure that eliminates the metal parts, and is readily washable. It is to such a need that the present invention is directed. In a preferred embodiment, the control element has additional means to retainer it in place in the cup even during impact.

SUMMARY OF THE INVENTION

The present invention is a control element for a drinking cup, and the drinking cup in which the cover has a drinking spout at one side and a vent at the other. Tubular elements extend down from under the spout and the vent. The flow control element of elastomeric material is provided having a pair of spaced cavities on one side, each cavity having a floor at the bottom thereof. In assembly, the cavities receive in frictional engagement the lower ends of the tubular elements. This engagement supports the flow control element with the floor of each cavity in sealed relation with respect to its tubular element. Each floor has a passage that is normally closed but opens on the occurrence of a pressure differential on opposite sides of the floor.

In a preferred embodiment, the control element includes a pair of shoulders that assist in maintaining the control element in place even during impact.

BRIEF DESCRIPTION OF THE DRAWINGS

Further objects and features of the present invention will be apparent to those skilled in the art from a study of the following specification and the accompanying drawings, all of which disclose a non-limiting embodiment of the invention. In the drawings:

FIG. 2 is an enlarged fragmentary sectional view taken on the line 4—4 of FIG. 1;

DESCRIPTION OF THE PREFERRED EMBODIMENT

Figure 1:
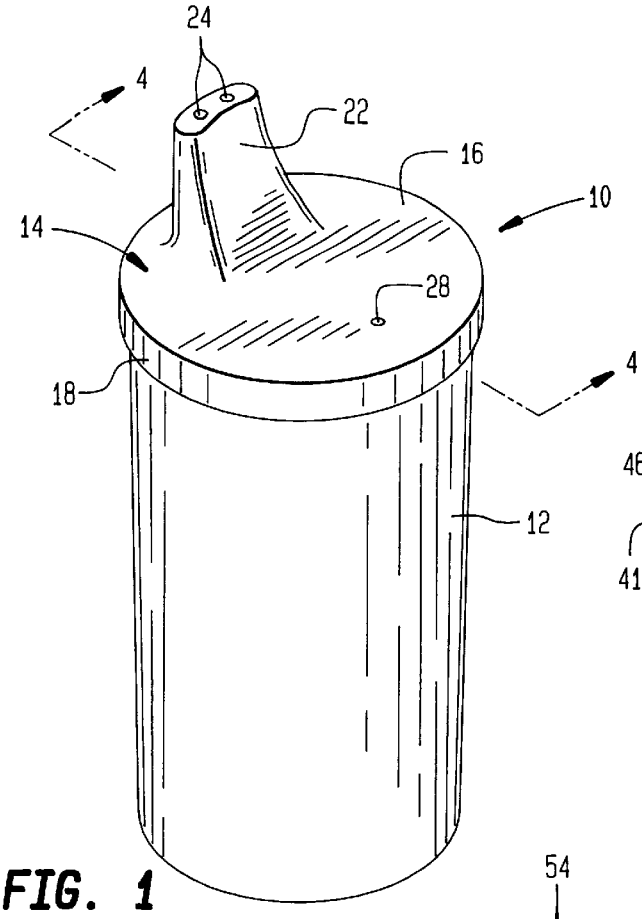
FIG. 1 is a perspective view of an assembled drinking cup that embodies the invention.

Referring to the drawings and, in particular, FIG. 1, a drinking cup that embodies the invention is generally represented by reference numeral 10. The drinking cup 10 comprises a cup-shaped container 12 having a cover 14 that may be screwed on to the top of the container by cooperant threads shown in FIG. 4. The cover 14 comprises a top wall 16 and a depending downward or side wall 18 formed with interior threads that engage exterior threads about the mouth of the container 12 as described.

Just inside the downward wall 18, the cover 14 may be provided with a short annular wall 20. Also, an O-ring (not shown) may be disposed in between the annular wall 20 and the side wall 18 of the cover 14. The O-ring may be compressed to form a liquid sealing joint between the cover 14 and the container 12.

One side of the top wall 16 is provided with a drinking spout 22 which has dispensing openings 24 at its distal end. Formed unnaturally with the cover 14 and extending downward from the spout 22 inside the cover is an element 26. In the embodiment shown in FIG. 1, the spout 22 and element 26 are tubular elements, however these elements can be any geometric shape. It is important that the spout 22 and element 26 communicate into liquid tight engagement. Therefore, the spout 22 and element 26 preferably have holes therethrough of the same shape.

At the opposite side of the top wall 16, the cover 14 is provided with a vent 28. Formed unnaturally with the cover 14 is a downward element 30 which communicates with the vent 28. In a preferred embodiment, element 30 is tubular in shape, however it can also be any shape. It is also preferable, that the since the vent 28 and element 30 have air tight communication between each other, that they have holes therethrough of the same shape.

Both elements 26 and 30 terminate downwardly at the same level in downwardly facing openings. In the preferred embodiment, both elements 26 and 30 are tubular or cylindrical. Since element 26 communicates with the spout 22, while the element 30 communicates with the vent 28, the diameter of element 26 is preferably larger than the diameter of element 30. However, it is understood that the diameter of the holes of each element 26, 30 can be any size and shape depending on the size and shape of the spout 22 and vent 28, respectively.

Figure 2:
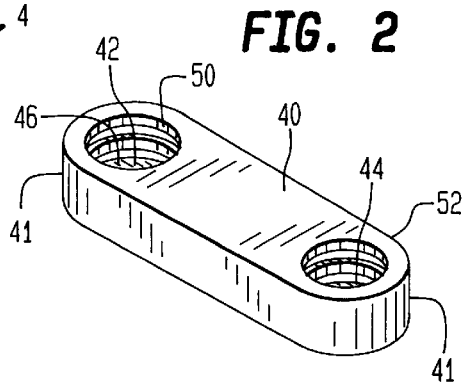
FIG. 2 is an enlarged perspective view of a first embodiment of the flow control element of the invention.

As shown in FIG. 2, there is provided a flow control element 40. It is preferably a single piece of elastomeric material, such as, for example, thermoplastic elastomer, silicone, or a soft rubber. The elastomeric material is resilient and flexible and does not have any separate parts, such as balls and springs. The control element 40 has a pair of spaced cavities 42, 44 formed in one side. The pair of spaced cavities 42, 44 are formed near opposite ends 41 of the control element 40. The cavities 42, 44 can have any shape, however they should have a shape that complements the shapes of elements 26, 30, respectively. Therefore, in a preferred embodiment, cavities 42, 44 should have a tubular or circular shape. Each cavity 42, 44 has a one or any number more of ribs 50, 52, respectively. In the preferred embodiment, each cavity 42, 44 has two ribs. These ribs 50, 52 act to seal the cavity 42,44 to the respective element 26, 30.

Also, cavity 42 complements element 26 that communicates with spout 22, and cavity 44 complements element 30 that communicates with vent 28. Accordingly, in the preferred embodiment, the cavities 42, 44 are cylindrical. Furthermore, the diameter of cavity 42 is greater than the diameter of cavity 44 due to the difference in the diameters of the spout 22 and the vent 28. For example, in an embodiment in which the elements 26, 30 are cylindrical and with conventional, different diameters, cavity 42 has a rib diameter about 0.57 inches and a flat (the area between ribs) diameter about 0.63 inches, whereas cavity 44 has a rib diameter about 0.50 inches and a flat diameter about 0.55 inches.

Figure 4:
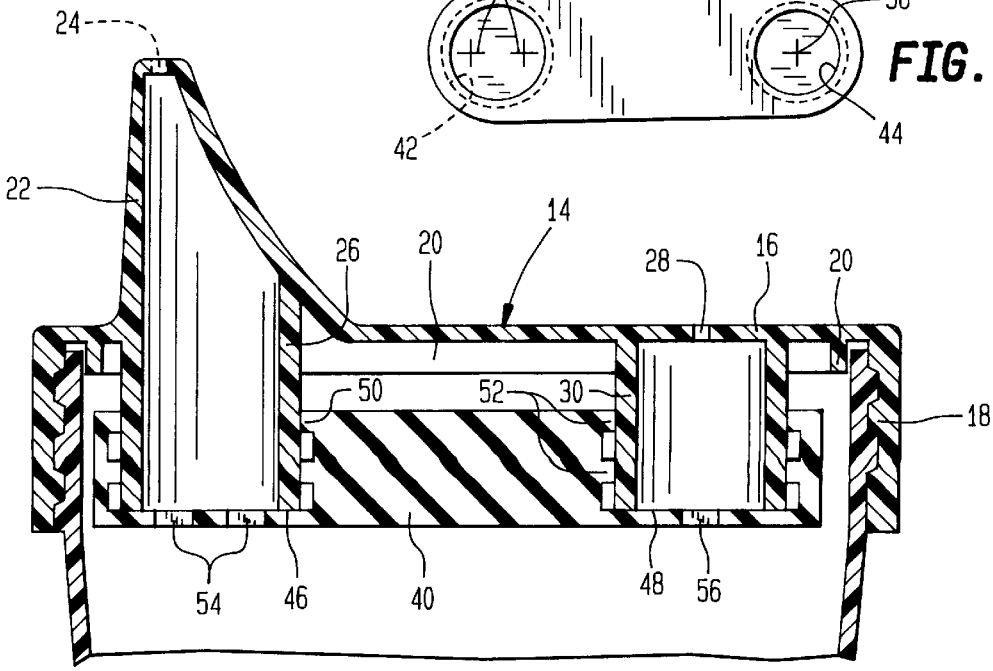

In the preferred embodiment, the spout 22 is closer to side wall 18 than vent 28. Accordingly, as shown in FIG. 4, the cavity 42 is closed to edge 41 than cavity 44 is to respective edge 41. It should be understood, however, that if the relationship of the spout 22 and vent 28 to side wall 18 varies so does the relationship of the cavities 42, 44 to edge 41. Accordingly, cavities 42, 44 can be equidistant from respective edges 41, or cavity 44 can be closer than cavity 42 to respective edge 41.

The control element 40 is formed with floors 46, 48 at the bottom of each cavity 42, 44, respectively. As stated above, extending inward from the sides of each cavity 42, 44 are, in a preferred embodiment, a pair of spaced horizontal inward circumferential ribs 50, 52, respectively. In particular, cavity 44 has a pair of ribs 50, and cavity 44 has a pair of ribs 52. As also stated above, each cavity may have any number of ribs. The ribs 50, 52 secure the control element 40 onto elements 26, 30, respectively, by frictional engaging the exterior walls of the elements. It is preferred that the lowermost one of the pair of ribs 50 in cavity 46 not contact floor 46, and likewise the lowermost one of the pair of ribs 52 in cavity 44 not contact floor 48. By this feature, the least amount of tension is placed on the control element 40 during use. By minimizing this tension, the sealing characteristics of the slit is optimized.

Figure 3:
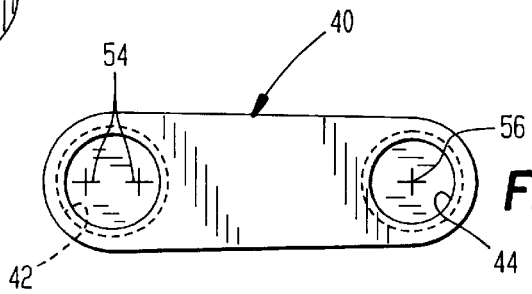
FIG. 3 is a top plan view of the flow control element of FIG. 2.

Referring to FIGS. 3 and 4, the floors 46, 48 are formed with slits 54, 56, respectively. The slits 54, 56 can have many forms, two of which are "Y"- or "X"-shaped slits for the passage of fluid. Preferably, one slit 54, 56 in each floor 46, 48, respectively, is sufficient to facilitate the passage of liquid in element 26 and the passage of air in element 30. However, multiple slits in each floor may be designed to provide the same function.

In the assembly shown in FIG. 4, the two cavities 42, 44 are aligned with the two, preferably tubular, elements 26, 30 and the control element 40 is raised. The elastomeric nature of the control element 40 is sufficient to flex as the control element is effected. The control element 40 is then shoved "home" on each element 26, 30 so that the lower ends of the elements abut against the floors 46, 48, respectively and effect therewith a snug contact that amounts to a seal, especially in view of ribs 50, 52 frictional contact on elements 26, 30, respectively. Slight imprecision in the dimensions of the cavities 42, 44 or of the control element 40 can be tolerated due to the soft resilient nature of the control element and, perhaps, the ribs 50, 52.

After the container 12 is filled with liquid, the cover 14 is screwed onto the container. As the infant tilts the container and sucks liquid through the openings 24, the slits 54 yield and part in the center of the slits. When the sucking pressure relents, the resilience of the cavity 42 causes the slit 54 to close once more so that were the cup 10 to be tipped over or to fall on the floor, no appreciable liquid would pass out the openings 24.

As the liquid is removed as by sucking on spout 22, a negative pressure builds up in the head space above the liquid. To avoid this pressure—pressure differential across the floor 48—becoming too great, the slits 56 yield, the centers moving downward to permit passage of atmosphere through the opening 28 and through the slits. When the pressure differential is substantially returned to zero, the resilience of the control element 40 causes the slits to close so that should an upset occur, no liquid could escape outwardly therefrom through vent opening 28, and a leak through that route is avoided.

Figure 5:
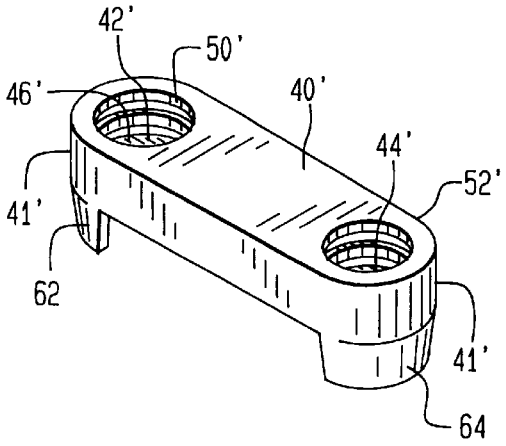
FIG. 5 is an enlarged perspective view of a second embodiment of the flow control element of the invention.
Figure 6:
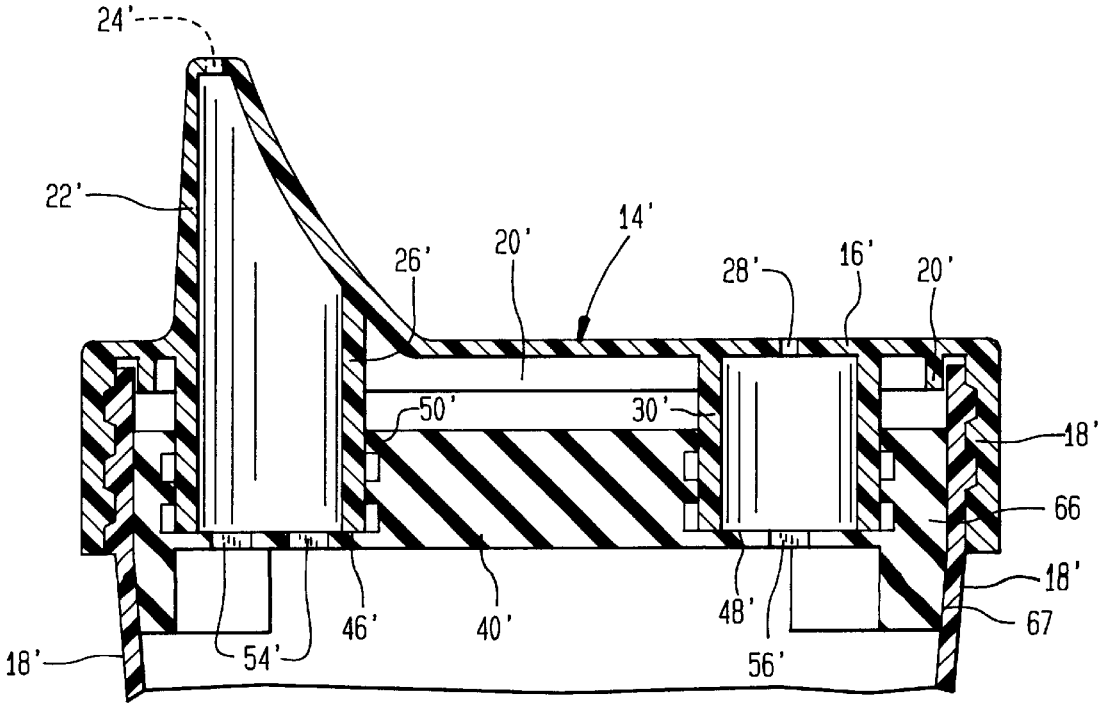
FIG. 6 is an enlarged fragmentary sectional view taken on the line 4—4 of FIG. 1 of the flow control element of the second embodiment of FIG. 5.

Referring to the second embodiment of FIGS. 5 and 6, the same elements recited above will bear the same reference numeral except with a prime. As shown in FIG. 5, the control element 40' includes a pair of shoulders 62, 64 adjacent the opposite ends or edges 41' of the control element, and extending in a direction opposite the opening of each cavity 42', 44'. Each shoulder 62, 64 has a surface configuration analogous to that of the ends 41'.

As shown in FIG. 6, in the most preferred embodiment, each shoulder 62, 64 has a portion 66 that may be either straight or chamfered and an inwardly chamfered or angled portion 67. The chamfered portion 67 is adapted to mate with the inside surface of the side walls 18' of the container in order to prevent the control element from disengaging elements 26' and 30'. In a preferred embodiment, the chamfered portion 67 may be at angle of about seventy-seven degrees with the vertical, straight portion.

In the most preferred embodiment shown in FIG. 6, each shoulder 62, 64 has a vertical extant of the valve and shoulder about 0.54 inches. The vertical extant of each shoulder 62, 64 is affected by its distance from edge 41, which as stated above is dictated by the position of spout 22' and vent 28' from the side wall 18' of the container.

It is understood that the shoulders 62, 64 can consist solely of a straight portion, an outwardly angled, an inwardly angled portion or any combination of same depending on the angle of the walls of the container 12. In addition, the shoulders 62, 64 can have any shape. The sole criteria is that is mates with the inside of the side walls 18' of the container to help prevent the control element 40 from disengaging the elements 26', 30'. The pressure for the control element 40' to dislodge particularly occurs when the control element 40' is forced away from the spout and vent of the cover upon impact.

In either embodiments, after use, the cup 10 of the invention may be readily disassembled. Referring to FIG. 1, the cover 14 may be removed and the control element 40 simply withdrawn off the elements 26, 30. All of the components are readily washable.

It will be seen that the invention provides a training cup of three simple parts which is inexpensively and readily made and assembled and works effectively to avoid spills and drips.

The invention described here may take a number of forms. It is not limited to the embodiment disclosed but is of a scope defined by the following claim language which may be broadened by an extension of the right of exclude others from making, using or selling the invention as is appropriate under the doctrine of equivalents.

What I claim is:

1. A drinking cup comprising:

a cup-shaped container having a removable leakproof cover, the cover comprising a top wall having at one side an upwardly extending drinking spout and spaced therefrom a vent, the top wall being formed on its underside with a pair of spaced elements, one of the pair of spaced elements communicating with and extending downward from under the spout and the other of the pair of elements communicating with and extending downward from the vent; and a flow control element comprising a flat piece of flexible elastomeric material having a pair of spaced cavities on one side, each of said pair of cavities having a floor at the bottom thereof, each of said pair of cavities receiving the lower ends of the elements in frictional engagement sufficient to support said flow control element with said floors in sealed relation to the respective elements, each of said floors having a passage therethrough which is normally closed by opens upon occurrence of a pressure differential on opposite sides of said floor.

2. The drinking cup according to claim 1, wherein the elements are cylindrical.

3. The drinking cup according to claim 2, wherein the elements are of different diameters.

4. The drinking cup according to claim 1, wherein the element connected to the spout is of larger diameter than the element connected to the vent.

5. The drinking cup according to claim 2, wherein each of said pair of cavities is also cylindrical and sized to mate with element.

6. The drinking cup according to claim 1, wherein said floor associated with the element connected to the spout is formed with a plurality of openable passages.

7. The drinking cup according to claim 6, wherein each of the plurality of passages comprises a plurality of slits extending radially out from a point so that during pressure differential adjacent slits define pie-slice flaps.

8. The drinking cup according to claim 1, wherein each of said pair of cavities has side wall surfaces formed with inward ribs.

9. A flow control element removably positioned on a pair of spaced fluid-conducting elements, the flow control element comprising a flat elongate piece of material having a pair of spaced cavities in a first side thereof, each of said pair of cavities having a floor at the bottom thereof, each of said pair of cavities snugly receiving the ends of the fluid-conducting elements in frictional engagement sufficient to support said flow control element with said floors in sealed relation to the fluid-conducting elements, each of said floors having a passage therethrough that is normally closed, but opens upon occurrence of a pressure differential on opposite sides of said floor.

10. The flow control element according to claim 9, wherein each of said pair of cavities has a different diameter.

11. The flow control element according to claim 9, wherein each of said pair of cavities is cylindrical and sized in diameter to mate with the fluid-conducting elements.

12. The flow control element according to claim 9, wherein said floor associated with the fluid-conducting element connected to the drinking spout is formed with a plurality of openable passages.

13. The flow control element according to claim 12, wherein the plurality of openable passages each comprise a plurality of slits extending radially out from a point so that during pressure differential adjacent slits define pie-slice flaps.

14. The flow control element according to claim 9, wherein each cavity has side wall surfaces formed with inward ribs.

15. The flow control element according to claim 9, further comprising a pair of shoulders.

16. The flow control element according to claim 14, wherein each of said pair of shoulders extends in a direction opposite the first side.

17. The flow control element according to claim 16, wherein each of said pair of shoulders has a straight portion and a chamfered portion.

18. The flow control element according to claim 17, wherein the chamfered portion forms an angle of about seventy-seven degrees.

19. The drinking cup comprising:

a cup-shaped container having a removable leakproof cover, the cover comprising a top wall having at one side an upwardly extending drinking spout and on the opposite side a vent, the top wall being formed unnaturally on its underside with spaced conduits extending downward from under the spout and the vent and communicating therewith and a flat flow controller of resilient material having a pair of spaced cavities on one side, each of said pair of cavities having a diaphragm at the bottom thereof, each of said pair of cavities receiving the lower ends of the conduits in frictional engagement sufficient to support the flow controller with the diaphragms in sealed relation to the elements, each of the diaphragms having a passage therethrough which is normally closed, but opens upon occurrence of a pressure differential on opposite sides of the diaphragm.

20. The drinking cup according to claim 19, wherein said flow controller further comprises a pair of shoulders.

21. A method of controlling flow of fluid in a liquid-containing closed vessel having a top wall formed with an outlet spout through which the liquid may be aspirated and a vent spaced from the spout, the spout and vent having parallel elements extending into the vessel, the method comprising the steps of:

(1) providing a flat element of flexible elastomeric material having a pair of spaced cavities on one side, each cavity having a floor at the bottom thereof; and (2) installing the flat element with the cavities receiving and frictionally engaging the elements so that the elements are in sealing relation with the floors, the floors each having passages therein openable upon the occurrence of a pressure differential on opposite sides of the floor.

*22. A drinking cup comprising:*

*a container having a removable cover, said cover having a drinking spout, a vent, and a pair of downwardly depending spaced elements, one of said pair of spaced elements communicating with said spout and the other of said pair of spaced elements communicating with said vent; and*

*a flow control element comprising a pair of spaced cavities, each of said pair of cavities having a wall and a flexible membrane in communication with said wall, said wall of each of said pair of cavities being frictionally engaged with one of said pair of spaced elements to support said flow control element and seal said cavities to said spaced elements so that said flexible membranes are positioned respectively between said drinking spout and vent of said cover and the interior of said container, each of said membranes having a passage therethrough that is normally closed but opens upon occurrence of a pressure differential on opposite sides of said membrane.*

*23. A flow control element suitable for use in a substantially leak-proof drinking cup that includes a lid, the lid having a spout, an air vent and a pair of downwardly depending elements, the first of the pair of elements depending from and being in liquid tight communication with the spout and the second of the pair of elements depending from and being in liquid tight communication with the vent, said flow control element comprising:*

*a first valve having an elastomeric diaphragm;*

*a second valve having an elastomeric diaphragm;*

*a first wall being in communication with said first elastomeric diaphragm and having a surface that is frictionally and sealingly engagable with the first depending element; and*

*a second wall being in communication with said second elastomeric diaphragm, and having a surface that is frictionally and sealingly engagable with the second depending element, said surfaces of said first and second walls relative to the first and second depending elements being suitable for frictionally securing said flow control element to the first and second depending elements of the lid so as to position said first and second elastomeric diaphragms respectively between the spout and air vent of the lid and the interior of the drinking cup,*

*wherein each of said first and second elastometric diaphragms includes at least one perforation therethrough such that said first and second elastometric diaphragms can temporarily open to permit fluid to pass through said diaphragms in response to a pressure differential.*

*24. A drinking cup comprising:*

*a container for holding a fluid; and*

*a sealing lid for sealing said container,*

*wherein said sealing lid has an air vent, a drinking spout and two downwardly extending elements, one of said two elements being an air vent element in communication with said air vent, and the other of said two elements being a drinking spout element in liquid tight engagement with said drinking spout,*

*wherein said drinking cup has an air vent valve and a drinking spout valve, each of said valves having a wall and a self-sealing elastomeric membrane in communication with said wall, wherein said wall and said membrane of each of said valves together define a cavity,*

*wherein said wall of said air vent valve is frictionally sealingly secured to said air vent element, and wherein said wall of said drinking spout valve is frictionally sealingly secured to said drinking spout element so as to position said elastomeric membranes of said valves respectively between said air vent and said drinking spout of said lid and the interior of said container, and*

*wherein at least one of said elastomeric membranes has at least one perforation therein.*

*25. The drinking cup of claim 24, wherein said wall of said air vent valve is secured to said air vent element by friction.*

*26. The drinking cup of claim 24, wherein said wall of said drinking spout valve is secured to said drinking spout element by friction.*

*27. The drinking cup of claim 24, wherein said air vent valve and said drinking spout valve are located on a common substrate.*

*28. The drinking cup of claim 27, wherein said common substrate is elastomeric.*

*29. The drinking cup of claim 28, wherein said air vent valve, said drinking spout valve and said common substrate make up a single, integrally molded element.*

*30. The drinking cup of claim 24, wherein said drinking cup includes a flow control element, said valves being part of said flow control element, and wherein said flow control element is secured to said lid only by said securement of said walls of said valves to said two downwardly extending elements.*

*31. The drinking cup of claim 24, wherein said perforation includes a slit.*

*32. A method of controlling flow of fluid in a closed vessel having a top wall formed with an outlet spout through which the liquid may be aspirated and a vent spaced from the spout, the method comprising the steps of:*

*(1) providing said top wall with a pair of downwardly depending spaced elements, one spaced element being in communication with said spout and the other spaced element being in communication with said vent; and*

*(2) providing a flow control element with a pair of elastomeric valves, each valve being in communication with a wall that is sealingly engaged with one of said spaced elements so as to position said elastomeric valves respectively between the outlet spout and the vent of the top wall and the interior of the vessel, each of said pair of elastomeric valves having a passage therein that is normally closed and is openable upon the occurrence of a pressure differential on opposite sides of said elastomeric valve.*

*33. The method of claim 32, wherein said passage is a slit.*

*34. The method of claim 32, wherein both of said elastomeric valves are located on a single substrate.*

*35. The method of claim 34, wherein said single substrate is elastomeric.*

*36. The method of claim 34, wherein said pair of elastomeric valves and said single substrate make up a single integrally molded element.*

*37. The method of claim 32, wherein at least one of said walls in communication with one of said pair of elastomeric valves is sealingly engaged with said one of said spaced elements by friction.*

*38. A drinking cup comprising:*

*a container having a removable cover, said cover having a drinking spout, a vent, and a pair of downwardly depending spaced fluid-conducting elements, one of said pair of spaced elements communicating with said spout and the other of said pair of spaced elements communicating with said vent; and*

*a flow control element comprising a pair of spaced walls, each of said pair of walls communicating with a separate diaphragm, wherein each of said pair of walls and said diaphragm in communication therewith define a cavity above said diaphragm, one of said pair of walls being engaged with one of said spaced elements, and the other of said pair of walls being engaged with the other of said pair of spaced elements, to mount said flow control element onto and seal said cavities relative to said spaced elements so that said diaphragms are positioned respectively between said drinking spout and vent of said cover and the interior of said container, each of said diaphragms having a passage therethrough that is normally closed but opens upon occurrence of a pressure differential on opposite sides of said diaphragm.*

*39. The drinking cup of claim 38, wherein said flow control element is mounted to said spaced elements only by frictional engagement of said walls with said spaced elements.*

*40. The drinking cup of claim 38, wherein each of said pair of walls extends in an upward direction relative to its respective said diaphragm.*

*41. The drinking cup of claim 38, wherein the shape of said pair of walls complements the shape of said spaced elements.*

*42. The drinking cup of claim 41, wherein said pair of walls and said spaced elements are tubular.*

*43. A drinking cup comprising:*

*a container having a removable cover, said cover having a drinking spout, a vent, and a pair of downwardly depending spaced fluid-conducting elements, one of said pair of spaced elements communicating with said spout and the other of said pair of spaced elements communicating with said vent; and*

*a flow control element comprising a pair of spaced walls, each of said pair of walls communicating with a diaphragm, wherein each of said pair of walls and said diaphragm in association therewith define a cavity on the same side of said diaphragm, one of said pair of walls having a surface that receives and engages one of said spaced elements, and the other of said pair of walls having a surface that receives and engages the other of said spaced elements, to mount said flow control element onto and seal said cavities relative to said spaced elements so that said diaphragms are positioned respectively between said drinking spout and vent of said cover and the interior of said container, each of said diaphragms having a passage therethrough that is normally closed but opens upon occurrence of a pressure differential on opposite sides of said diaphragm.*

*44. The flow control element of claim 43, wherein said flow control element is mounted to said spaced elements only by frictional engagement of said pair of walls with said spaced elements.*

*45. The flow control element of claim 43, wherein each of said diaphragms is elastomeric.*

*46. The flow control element of claim 43, wherein said flow control element is elastomeric.*

*47. The drinking cup of claim 43, wherein the shape of said pair of walls complements the shape of said spaced elements.*

*48. The drinking cup of claim 47, wherein said pair of walls and said spaced elements are tubular.*

* * * * *